(12) United States Patent
Hirth et al.

(10) Patent No.: US 12,085,003 B2
(45) Date of Patent: Sep. 10, 2024

(54) CERAMIC HEATING PLATE AS HEATING ELEMENT

(71) Applicant: Vitesco Technologies GmbH, Regensburg (DE)

(72) Inventors: Peter Hirth, Rösrath (DE); Rolf Brück, Bergisch Gladbach (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/265,912

(22) PCT Filed: Dec. 1, 2021

(86) PCT No.: PCT/EP2021/083848
§ 371 (c)(1),
(2) Date: Jun. 7, 2023

(87) PCT Pub. No.: WO2022/122516
PCT Pub. Date: Jun. 16, 2022

(65) Prior Publication Data
US 2024/0102411 A1  Mar. 28, 2024

(30) Foreign Application Priority Data
Dec. 11, 2020 (DE) ............ 10 2020 215 753.7

(51) Int. Cl.
*F01N 3/20* (2006.01)
*F01N 3/28* (2006.01)
*F01N 13/16* (2010.01)

(52) U.S. Cl.
CPC ......... *F01N 3/2889* (2013.01); *F01N 3/2026* (2013.01); *F01N 13/16* (2013.01)

(58) Field of Classification Search
CPC .... F01N 3/2889; F01N 3/2026; F01N 3/2013; F01N 3/2828; F01N 3/281; F01N 3/027;
(Continued)

(56) References Cited

U.S. PATENT DOCUMENTS 5,519,191 A * 5/1996 Ketcham .............. F01N 3/2026
422/174
5,526,462 A * 6/1996 Kondo ................. F01N 3/2814
219/536

(Continued)

FOREIGN PATENT DOCUMENTS

DE          4339686        11/1994
DE         19943846         3/2001
(Continued)

OTHER PUBLICATIONS

Office Action of corresponding German Patent Application No. 10 2020 215 753.7.

*Primary Examiner* — Dapinder Singh
(74) *Attorney, Agent, or Firm* — Cozen O'Connor

(57) ABSTRACT

A device for aftertreatment of exhaust gases, having a flow section which is able to be flowed through by exhaust gas and has at least one honeycomb body, acting as a catalytic converter, and has at least one heating element. The heating element is formed from a ceramic material which is able to be flowed through along a plurality of flow channels from an inflow side to an outflow side. The heating element is electrically conductive along the walls delimiting the flow channels and, by an electrical contact, is connectable to a voltage source, wherein the heating element runs in a meandering manner over a through-flowable cross section of the flow section.

7 Claims, 2 Drawing Sheets

(58) Field of Classification Search
CPC .... F01N 3/0222; F01N 3/2842; F01N 3/2825; F01N 5/02; F01N 9/00; F01N 13/16; F01N 13/14; F01N 2240/02; F01N 2240/16; F01N 2240/20; F01N 2330/06; Y02T 10/12; Y02T 10/40
See application file for complete search history.

(56) References Cited

U.S. PATENT DOCUMENTS

| | | | | |
|---|---|---|---|---|
| 5,536,478 | A * | 7/1996 | Lipp | H05B 3/08 |
| | | | | 422/174 |
| 5,749,223 | A * | 5/1998 | Kreucher | F01N 3/2013 |
| | | | | 422/174 |
| 2002/0092298 | A1* | 7/2002 | Bruck | F01N 3/027 |
| | | | | 60/300 |
| 2015/0267583 | A1* | 9/2015 | Brueck | F01N 3/0222 |
| | | | | 264/129 |
| 2018/0291787 | A1* | 10/2018 | Bartolo | F01N 3/2882 |

FOREIGN PATENT DOCUMENTS

| | | |
|---|---|---|
| DE | 102012109391 | 4/2014 |
| DE | 102017124276 | 4/2019 |
| EP | 0595076 | 5/1994 |

* cited by examiner

CERAMIC HEATING PLATE AS HEATING ELEMENT

CROSS REFERENCE TO RELATED APPLICATIONS

This is a U.S. national stage of Application No. PCT/EP2021/083848 filed Dec. 1, 2021. Priority is claimed on German Application No. DE 10 2020 215 753.7 filed Dec. 11, 2020 the content of which is incorporated herein by reference.

BACKGROUND OF THE INVENTION

1. Field of the Invention

The disclosure relates to a device for aftertreatment of exhaust gases, having a flow section, which is able to be flowed through by exhaust gas and has at least one honeycomb body acting as a catalytic converter, and at least one heating element, wherein the heating element is formed from a ceramic material that is able to be flowed through along a plurality of flow channels from an inflow side to an outflow side, wherein the heating element is electrically conductive along the walls delimiting the flow channels.

2. Description of the Related Art

For the purpose of heating catalytic converters, for example in exhaust systems of internal combustion engines, use is made of heating elements to reach at an early stage, which is referred to as the so-called light-off temperature of the catalytic converters, from which the chemical conversion of the exhaust gases functions particularly efficiently. For this purpose, the heating elements are formed by electrically conductive conductor structures connected to a voltage source and which, in this way, generate heat using the ohmic resistance.

The prior art has disclosed a large number of heating disks for use in exhaust-gas installations of internal combustion engines. Use is made inter alia of metallic honeycomb bodies formed from a plurality of metallic foils which are stacked one on top of the other and are wound up. In this way, honeycomb bodies having a plurality of through-flowable flow channels which can be flowed through by the exhaust gas are formed. The heating disks are connected to a voltage source via an electrical connection.

As an alternative to this, heating disks composed of ceramic materials having a metallic conductor which is connected to a voltage source and which can be heated using the ohmic resistance are known.

A particular disadvantage of the devices in the prior art is that complex insulation measures must be taken to prevent the current following an unwanted path and electrical short circuits thus occurring. Also, the occurrence of unwanted hot spots along the heating element is possible if the flowing current follows the shortest possible path and there are consequently formed sections at the heating element which are flowed through by the current, and thereby heated, significantly more intensely than other regions. Hot spots may be disadvantageous in particular with regard to durability, and in addition a non-homogeneous heat distribution over the cross section of the through-flowable catalytic converter is disadvantageous with regard to the efficiency of the catalytic converter.

SUMMARY OF THE INVENTION

It is an object of one aspect of the present invention to provide a device having a catalytic converter and having a heating element, wherein the heating element is simple to produce, is durable and can be easily adapted to different requirements.

One aspect of the invention relates to a device for aftertreatment of exhaust gases, having a flow section which is able to be flowed through by exhaust gas and has at least one honeycomb body, acting as a catalytic converter, and has at least one heating element, wherein the heating element is formed from a ceramic material which is able to be flowed through along a plurality of flow channels from an inflow side to an outflow side, wherein the heating element is electrically conductive along the walls delimiting the flow channels and, by an electrical contact, is connectable to a voltage source, wherein the heating element runs in a meandering manner over a through-flowable cross section of the flow section.

The heating element can preferably be created from a disk-shaped honeycomb body, which can be produced for example through extrusion. The disk-shaped honeycomb body can be machined, for example by way of a cutting process, and in this way a desired form can be created. Preferably, the heating element is of meandering form and, in this way, forms a heating section which extends over the through-flowable cross section of the device for exhaust-gas aftertreatment. As an alternative, the heating element may also be already created as a heating section of meandering form by a suitable shaping process.

The heating element preferably has a structure as a ceramic honeycomb body of a catalytically active catalytic converter also has. A multiplicity of fine channels leads through the honeycomb body from an inflow side to an outflow side, so that the honeycomb body, like the heating element too, is gas-permeable along a defined main direction overall.

The electrical conductivity of the heating element is achieved by the channel walls delimiting the flow channels. For this purpose, the ceramic may be provided for example with an electrically conductive coating. Alternatively, metallic particles may be added to the ceramic such that the metallic ceramic mixture is electrically conductive overall.

As a result of its meandering construction, the heating element is particularly well suited for covering as large a part of the through-flowable cross section as possible, in order to achieve heating of the flowing exhaust gas that is as homogeneous and intense as possible. In principle, the heating element may be constructed by 180-degree deflections which are arranged in an alternating manner in rows so that portions of the heating element that run parallel to one another are formed. Alternatively, a spiral arrangement of the individual portions of the heating element may also be preferred, this being known for example from metallic honeycomb bodies for heating disks in the prior art.

The aim is for the through-flowable cross section to be covered over the largest possible area without individual portions of the heating element coming into electrically conductive contact with one another.

The heating element may be completely arranged in a single plane. As an alternative to this, the heating element may also be arranged for example in two or more planes which are spaced apart from one another. For this purpose, after a deflection, the heating element would run along the main throughflow direction of the honeycomb body and, in this way, connect the two planes to one another. The heating element may consequently also have an extent along the main throughflow direction of the honeycomb body.

It is particularly advantageous if the heating element has multiple deflections within a plane. Deflections through 180 degrees are particularly advantageous for achieving the best possible utilization of the cross-sectional area of the honeycomb body available, and in this way for generating as high a heating power as possible.

Furthermore, it is preferable if the heating element is formed from a ceramic honeycomb body. A heating element which is formed from a disk-shaped honeycomb body by a cutting process is particularly advantageous.

It is also advantageous if, at the deflections, the heating element has a cross-sectional thickening of the electrically conductive structure in comparison with the remaining regions of the heating element. The electrically conductive structure is formed by the channel walls. In order to achieve a cross-sectional thickening in the region of the deflection, it is possible for example for there to be sectionally arranged more channel walls per unit of area or for the thickness of the channel walls to be sectionally increased. As an alternative or in addition to this, the porosity of the channel walls may differ. High porosity results in more air per unit of volume in the material, whereby less conductive material is present there overall. Reduced porosity thus results in more material per unit of volume, whereby, in relative terms, more material is present there.

A material thickening in the region of the deflections is advantageous for avoiding the formation of so-called hot spots. The material thickening results in there being locally present more material that can be flowed through by the current along the heating element. The heat generated at the heating element is thus distributed over more mass, whereby the maximum local heating is reduced.

In a preferred configuration, the cross-sectional thickening of the electrically conductive structure may also vary over the cross section of the heating element, so that, for example, regions which are close to the inner smaller radius of curvature in the region of the deflection are thickened cross-sectionally to a relatively small extent, or are even reduced in thickness cross-sectionally, while regions which are close to the outer larger radius of curvature in the region of the deflection are thickened cross-sectionally to a relatively large extent. This can be advantageous in particular in order to influence the current flow along the heating element in a targeted manner and, in this way, to avoid the formation of hot spots on account of an increased current throughflow.

A preferred exemplary aspect is characterized in that, in the regions of the deflections, the heating element has a thermal conductivity which is different over the cross section of the heating element than at the portions before and after the deflections.

The relatively low thermal conductivity counteracts the formation of local hot spots. Reduced thermal conductivity may be produced for example by a specific material selection in that, for example, the regions of the deflections are manufactured from a different material than the rest of the heating element. It is also possible for the base material of the heating element to have, for example in the region of the deflections, a further material or a further element added to it.

Preferably, the thermal conductivity at the inner edge of the deflection, adjacent to the smaller radii of curvature, is different from the thermal conductivity at the outer edge of the deflection, adjacent to the larger radii of curvature. This allows the thermal conductivity to be configured in such a way that the formation of hot spots, in particular in the region of the smaller radii of curvature, is avoided. The thermal conductivity may be influence inter alia by the material selection, the porosity, the cross-section area of the heating element or the number and thickness of the channel walls.

It is also preferable if, in the regions of the deflections, the heating element has a heat capacity which is different over the cross section of the heating element than at the portions before and after the deflections. The local generation of a relatively high heat capacity, too, counteracts the formation of local hot spots, whereby a more homogeneous heat distribution is achieved overall. Also here, it is preferably the case that the thermal capacity, in each case produced by the selection of the parameters, in the region of the smaller radii of curvature is different from the thermal capacity in the region of the larger radii.

It is also advantageous if, in the regions of the deflections, the heating element has an electrical resistance which is different over the cross section of the heating element. The electrical resistivity can likewise be influenced by the material properties already mentioned. Advantageously, the electrical resistivity is also adapted over the cross section of the heating element such that the formation of hot spots is reduced or completely avoided. Preferably, the heating element has a higher electrical resistance in the region of the smaller or tighter radii of curvature than in the region of the larger or wider radii of curvature. This advantageously results in a shift of the main conduction path of the current from the inner side of the deflection to the outer side of the deflection.

It is also advantageous if the proportion of electrically conductive material per unit of area is regionally different. In this regard, regions having particularly good conductivity and regions having less good conductivity can be produced within the heating element. In this way, the current flow along the heating element can be advantageously influenced.

Advantageous refinements of the present invention are described in the dependent claims and in the following description of the figures.

BRIEF DESCRIPTION OF THE DRAWINGS

The invention will be discussed in detail below on the basis of exemplary embodiments with reference to the drawings. In the drawings.

DETAILED DESCRIPTION OF THE PRESENTLY PREFERRED EMBODIMENTS

Figure 1:
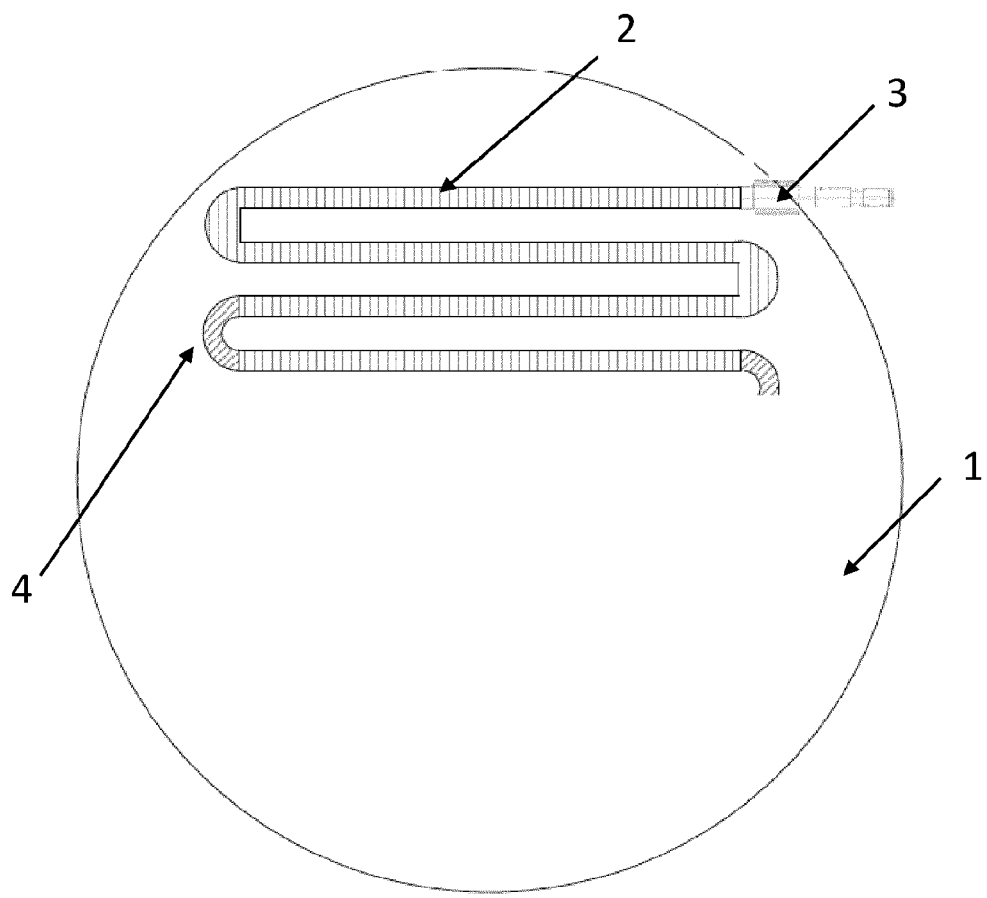
FIG. 1 is a plan view of a heating element which is arranged on one of the end faces of a heating disk formed by a honeycomb body.

FIG. 1 shows, in a schematically indicated manner, a flow cross section 1 of the device for exhaust-gas aftertreatment. Within said flow cross section 1, there is arranged a heating element 2 which has a multiplicity of through-flowable flow channels which can be flowed through along a main throughflow direction, which is parallel to a surface normal to the plane of the drawing. The individual flow channels are delimited by walls in a direction transverse to the main throughflow direction. Since the heating element 2 is manufactured from a ceramic material, either it is provided with an electrically conductive surface coating or it comprises a certain proportion of electrically conductive material. The ceramic may for example have metallic particles added to it in order to produce sufficient electrical conductivity.

The heating element 2 is heated through electrical energization of the heating element 2. For this purpose, the heating element 2 can be connected at an end side to a voltage source via electrical contact 3. Using the ohmic resistance, heating of the heating element 2 thus takes place if current flows through the heating element 2.

The heating element 2 running in a meandering manner in the exemplary embodiment in FIG. 1 may be created, for example by a machining process, from a honeycomb body which is in the form of a disk.

In the exemplary embodiment in FIG. 1, the heating element 2 is arranged in a meandering manner over the cross section 1 of the catalytic converter, which is arranged upstream or downstream in the flow direction (not shown in FIG. 1). Arrangements differing therefrom may also be provided in order to optimally utilize the cross-sectional area of the catalytic converter and to ensure heat transmission that is as good as possible and heat generation that is as homogeneous as possible.

In contrast to the exemplary embodiment in FIG. 1, the heating element may also run in a direction which follows a surface normal to the plane of the drawing. This is applicable in particular in the case of a heating element situated in multiple planes one behind the other.

The heating element 2 has multiple deflection regions 4 in which it changes its direction. Preferably, said deflection regions 4 are formed in such a way that generation of local hot spots is avoided or at least significantly reduced. For this purpose, the deflection region 4 may for example be of thickened design, have reduced porosity in comparison with the rest of the heating element 2, have relatively low thermal conductivity or have increased heat capacity. Also, the material used or the wall thickness may vary over the cross section of the deflection region 4.

Figure 2:
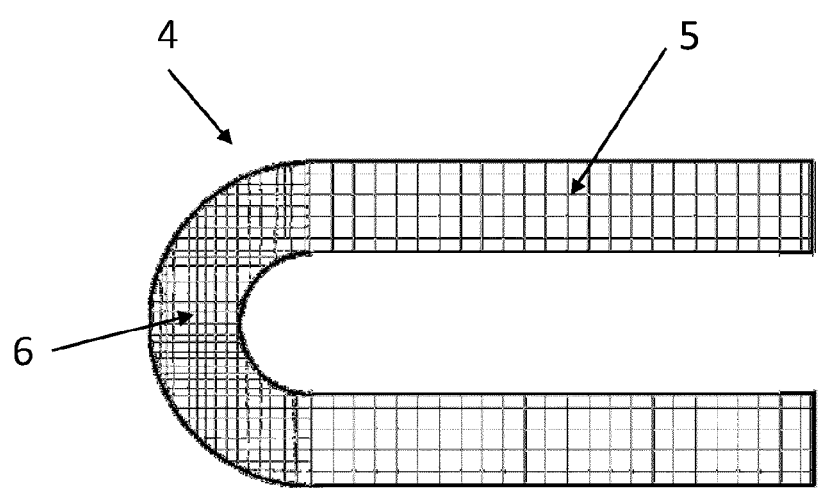
FIG. 2 is a plan view of a deflection region of the heating element, wherein the cell density in the region of the deflection is higher than in the rest of the heating element.

FIG. 2 shows a detail view of a deflection region 4, wherein provision is made in the curved region 6 of the deflection 4 of a cell density which is higher in comparison with the rest of the structure 5 of the heating element 2. The region 6 has more flow channels per unit of area than the rest of the heating element 2. This results in the properties as electrical conductor in the deflection region 4 being changed in comparison with the rest of the structure 5 of the heating element 2.

Figure 3:
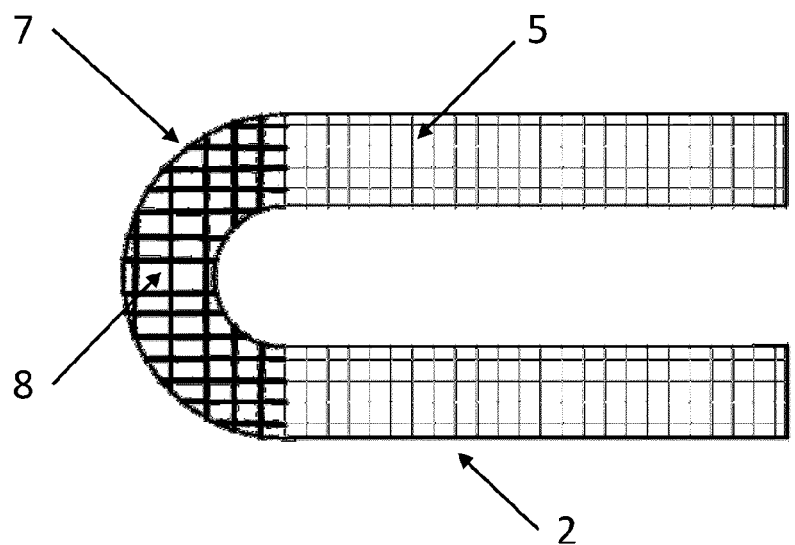
FIG. 3 is a plan view of a deflection region of the heating element, wherein the walls delimiting the flow channels are of thicker configuration in the region of the deflection than in the rest of the heating element.

FIG. 3 shows an alternative configuration of the deflection region 7, wherein, in the curved region 8 of the deflection 7, the walls present, which delimit the flow channels, have a larger wall thickness than in the rest of the structure 5 of the heating element 2. As a result of the increased wall thickness, the electrical conductivity is likewise influenced.

Figure 4:
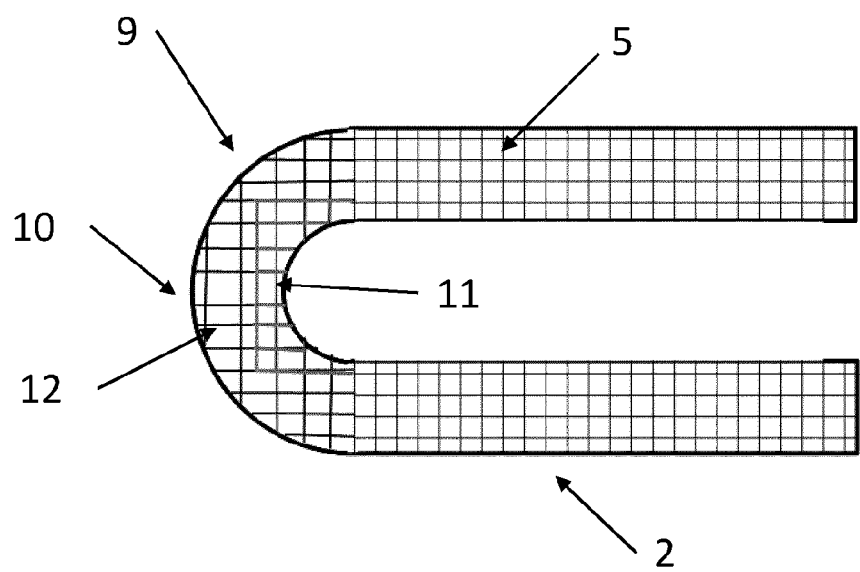
FIG. 4 is a plan view of a deflection region of the heating element, wherein the walls delimiting the flow channels are sectionally formed from a material with different material properties.

FIG. 4 shows a further alternative configuration of a deflection region 9, wherein, in the curved region 10 of the deflection 9, the walls delimiting the flow channels are formed from different materials. The walls arranged in the region 11 of the smaller inner radius are formed from a first material, while the walls arranged in the region 12 of the larger outer radius are formed from a second material.

The materials may differ from one another in particular through the electrical resistivity, the metal proportion, the porosity, the surface coating or a combination of the aforementioned properties.

All the embodiments shown in the exemplary embodiments in FIGS. 1 to 4 may be combined with one another in any desired manner. In particular, it may be provided that individual variations are restricted only to limited regions within the deflection. For example, that the inner region at the smaller bending radii is of different construction than the outer region at the larger bending radii.

The aim in particular is to produce suitable influencing of the current flow within the heating element 2 in order to avoid the occurrence of local hot spots. For this purpose, it is possible, in particular regionally, for the resistivity to be adapted in order to locally restrict or locally promote the current flow. It is in principle advantageous if an intensified current flow takes place in the outer regions of the deflection, in order, in this way, to avoid hot spots forming at the inner radius. Since the current follows the principle of least resistance, suitable current steering is ensured by the targeted influencing of the resistance.

The increase in the number of walls, the thickening of the walls, as well as the reduction in the porosity all result overall in an increase in the cross-sectional area able to be flowed through by the current, which changes the electrical resistance of the respective region, which in turn changes the current conduction, in particular the current distribution, over the cross section of the heating element.

Beside the influencing of the resistance for influencing the flow conduction, it is possible, by way of the above-described changes, for the thermal conductivity of the heating conductor to be influenced directly too, which allows heat to be dissipated and distributed more effectively, which likewise allows the formation of hot spots to be avoided.

The exemplary embodiments in FIGS. 1 to 4 have in particular no limiting character and serve to illustrate the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for aftertreatment of exhaust gas, comprising:
 a flow section which is able to be flowed through by the exhaust gas;
 at least one honeycomb body configured as a catalytic converter; and
 at least one heating element formed from a ceramic honeycomb body which is able to be flowed through along a plurality of flow channels from an inflow side to an outflow side, wherein the at least one heating element runs in a meandering manner over a through-flowable cross section of the flow section, wherein the meandering manner comprises at least one deflection in a plane, wherein, at the deflection, the ceramic honeycomb body has a cell density that is higher in comparison with a remainder of the heating element, wherein the at least one heating element is electrically conductive along walls delimiting the flow channels; and an electrical contact configured for connection to a voltage source.

2. The device as claimed in claim 1, wherein the at least one heating element is formed from a ceramic honeycomb body.

3. The device as claimed in claim 1, wherein the at least one heating element has multiple deflections within a plane.

4. The device as claimed in claim 3, wherein, at the deflections, the at least one heating element has a cross-sectional thickening of an electrically conductive structure in comparison with remaining regions of the at least one heating element.

5. The device as claimed in claim 3, wherein, in regions of the deflections, the at least one heating element has a thermal conductivity which is different over a cross section of at least one heating element than at portions before and after the deflections.

6. The device as claimed in claim 3, wherein, in regions of the deflections, the at least one heating element has a heat capacity which is different over a cross section of the at least one heating element than at portions before and after the deflections.

7. The device as claimed in claim 3, wherein, in regions of the deflections, the at least one heating element has an electrical resistance which is different over a cross section of the at least one heating element.

* * * * *